(12) United States Patent
Hokao et al.

(10) Patent No.: US 6,561,168 B2
(45) Date of Patent: May 13, 2003

(54) FUEL INJECTION DEVICE HAVING HEATER

(75) Inventors: Takayuki Hokao, Anjo (JP); Miyuki Tarusawa, Kariya (JP); Hideto Takeda, Kariya (JP); Hiroshi Hasegawa, Nagoya (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 10/108,984

(22) Filed: Mar. 29, 2002

(65) Prior Publication Data

US 2002/0139871 A1 Oct. 3, 2002

(30) Foreign Application Priority Data

Mar. 29, 2001 (JP) .......................................... 2001-95382
Aug. 7, 2001 (JP) ........................................ 2001-239086

(51) Int. Cl.⁷ ................................................. B05B 1/24

(52) U.S. Cl. ...................... 123/557; 123/41.31; 239/133

(58) Field of Search ............................... 123/557, 41.31, 123/472; 239/133, 132, 134, 136, 585.1, 585.4

(56) References Cited

U.S. PATENT DOCUMENTS

| 4,627,405 | A | * | 12/1986 | Imhof et al. ................. 123/549 |
| 5,201,341 | A | * | 4/1993 | Saito et al. .................. 137/341 |
| 5,361,990 | A | * | 11/1994 | Pimentel ..................... 239/133 |
| 5,758,826 | A | * | 6/1998 | Nines .......................... 239/136 |
| 5,915,626 | A | | 6/1999 | Awarzamani et al. |
| 5,927,255 | A | * | 7/1999 | Hubbard ..................... 123/543 |
| 6,109,543 | A | * | 8/2000 | Bright et al. ................ 239/135 |
| 6,135,360 | A | * | 10/2000 | Ren et al. .................... 239/136 |

FOREIGN PATENT DOCUMENTS

JP                63-170555          7/1988

* cited by examiner

*Primary Examiner*—Carl S. Miller
(74) *Attorney, Agent, or Firm*—Nixon & Vanderhye PC (57) ABSTRACT

A nozzle needle has a hollow tubular form having a closed base end. A heat transfer tube is press fitted into a first magnetic portion. The heat transfer tube surrounds an outer peripheral surface of the nozzle needle. A ceramic heater is formed as an integral cylindrical body by sintering a ceramic material together with a heat generating resistive element. A case covers the heater and protects the heater from externally applied water. An inner tube of the case is resiliently engaged with both the heater and the first magnetic portion. Heat of the heater is conducted to the nozzle needle through the inner tube, the first magnetic portion and the heat transfer tube to heat fuel inside the nozzle needle.

21 Claims, 8 Drawing Sheets

FUEL INJECTION DEVICE HAVING HEATER

CROSS REFERENCE TO RELATED APPLICATION

This application is based on and incorporates herein by reference Japanese Patent Application No. 2001-95382 filed on Mar. 29, 2001 and Japanese Patent Application No. 2001-239086 filed on Aug. 7, 2001.

BACKGROUND OF THE INVENTION

1. Field of the Invention:

The present invention relates to a fuel injection device for injecting fuel into a corresponding cylinder of an internal combustion engine.

2. Description of Related Art:

Recently, vehicle emission regulations have become increasingly stringent. In order to reduce noxious components in exhaust gases of an internal combustion engine (hereinafter, the internal combustion engine will be referred to as an engine), it is important to atomize fuel, which is injected through fuel injection holes of a fuel injection device (hereinafter, the fuel injection device will be referred to as a fuel injector) into a corresponding cylinder of the engine. One effective measure for atomizing the fuel is as follows. That is, fuel is first heated and is then injected through the injection holes of the injector, so that the fuel boils under reduced pressure upon the injection and is thus atomized. Particularly, the fuel injected during cold start-up of the engine cannot be easily atomized and tends to adhere, for example, to an inner wall of an intake pipe. Thus, it is effective to heat the fuel during the cold start-up of the engine to atomize the fuel. In a case of an injector disclosed in Japanese Unexamined Patent Publication No. 63-170555, a fuel heater is provided to a downstream-side end surface or a side surface of a component, which defines fuel injection holes.

Temperature of the fuel heater provided to the injector for heating the fuel during the cold start-up of the engine needs to be quickly raised. For this reason, a ceramic heater is widely used as the fuel heater of the injector.

Figure 15:
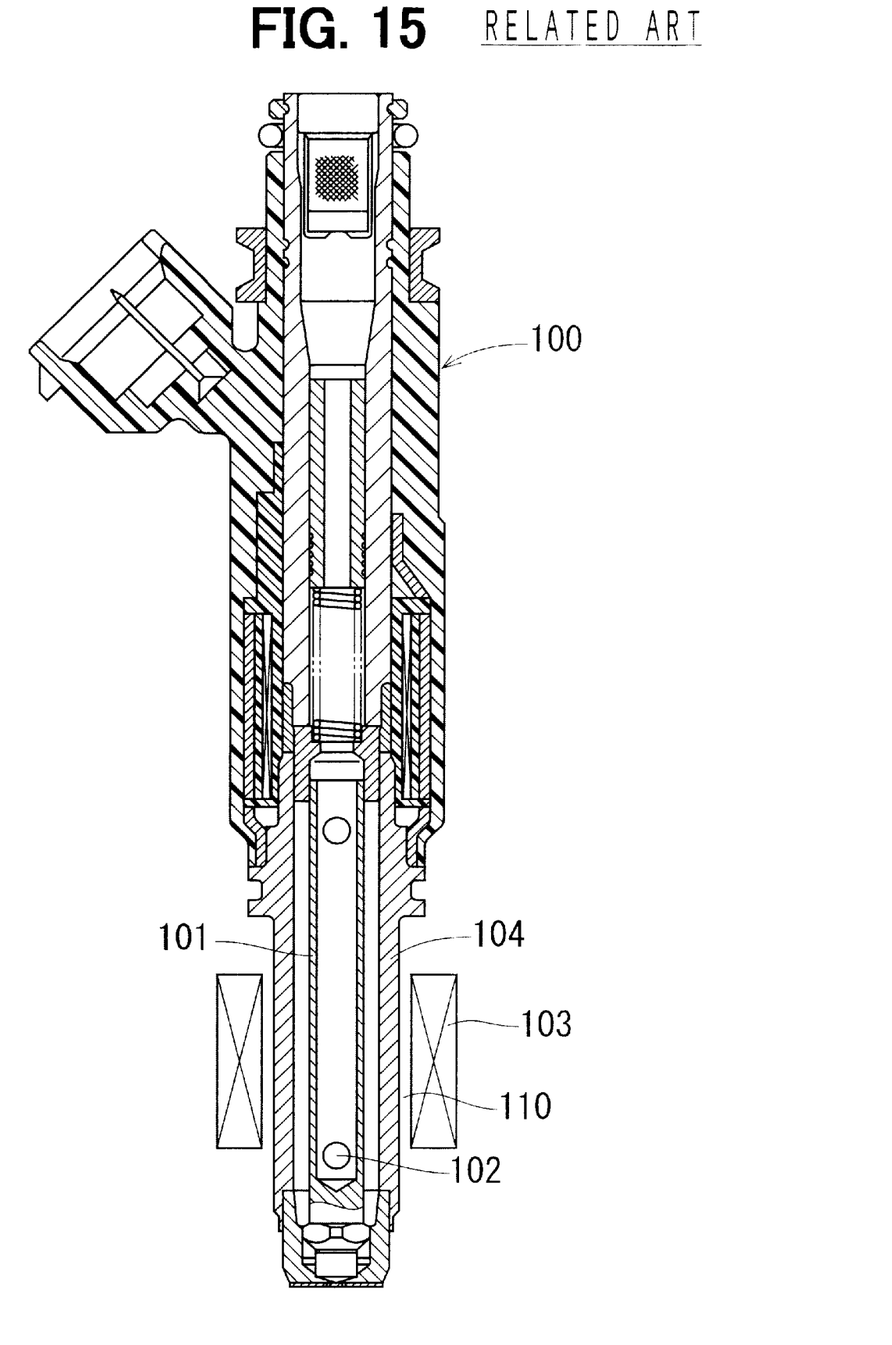
FIG. 15 is a cross-sectional view of a previously proposed fuel injector.

Furthermore, with reference to FIG. 15, it is conceivable to form a nozzle needle (valve member) 101, which opens and closes injection holes of an injector 100, into a hollow tubular form having a closed base end to achieve a faster response in the opening and closing operation of the injection holes of the injector 100.

However, in the injector 100 shown in FIG. 15, the fuel is conducted through an inside of the hollow tubular nozzle needle 101 and is conducted to an outside of the nozzle needle 101 through a communication hole 102. Then, this fuel is injected through the injection holes. Thus, heat of a heater 103 is not easily conducted to the fuel located inside the nozzle needle 101.

Furthermore, in order to effectively conduct the heat of the heater 103 to a valve body 104, which receives the nozzle needle 101 in a reciprocable manner, it is desirable to closely fit the heater 103 to an outer wall of the valve body 104. However, if the ceramic heater or the like, which has a relatively low mechanical strength with respect to a tensile force, is used as the cylindrical heater 103, it is difficult to closely fit the cylindrical heater 103 to the valve body 104 by press fitting the cylindrical heater 103 to an outer wall of the valve body 104 because of the relatively low mechanical strength of the ceramic heater with respect to the tensile force. Thus, an annular gap 110 needs to be provided between the heater 103 and the valve body 104, so that heat of the heater 103 is not effectively conducted to the valve body 104.

SUMMARY OF THE INVENTION

The present invention addresses the above disadvantages. Thus, it is an objective of the present invention to provide a fuel injection device that effectively heats and atomizes fuel.

To achieve the objective of the present invention, there is provided a fuel injection device including a valve body, a valve member, a heating means and a heat transfer member. The valve body includes a fuel passage, a fuel injection hole located at a downstream end of the fuel passage, and a valve seat positioned upstream of the fuel injection hole in the fuel passage. The valve member is reciprocably received in the fuel passage and has an engaging portion that is configured to be seated against the valve seat. The engaging portion closes the injection hole when the engaging portion is seated against the valve seat. The engaging portion opens the injection hole when the engaging portion is disengaged from the valve seat. The heating means directly heats at least a portion of an outer peripheral wall surface of the valve body located upstream of the valve seat. The heat transfer member is located between an inner peripheral wall surface of the valve body and the valve member. The valve member may have a hollow tubular form having a closed base end, which faces the valve seat. Furthermore, the valve member may have a communication hole, which penetrates through a peripheral wall of the valve member and is located downstream of a plane, which extends through an axial center of the heating means in a direction perpendicular to an axial direction of the valve member.

To achieve the objective of the present invention, there may be alternatively provided a fuel injection device including a valve body, a valve member, a heating means and a heat conductive resilient member. The valve body includes a fuel passage, a fuel injection hole located at a downstream end of the fuel passage, and a valve seat positioned upstream of the fuel injection hole in the fuel passage. The valve member is reciprocably received in the fuel passage. The valve member closes the injection hole when the valve member is seated against the valve seat. The valve member opens the injection hole when the valve member is disengaged from the valve seat. The heating means directly heats at least a portion of an outer peripheral wall surface of the valve body located upstream of the valve seat. The heat conductive resilient member is arranged between the valve body and the heating means and is resiliently engaged with both the valve body and the heating means. The heat conductive resilient member conducts heat of the heating means to the valve body.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings.

FIRST EMBODIMENT

Figure 1:
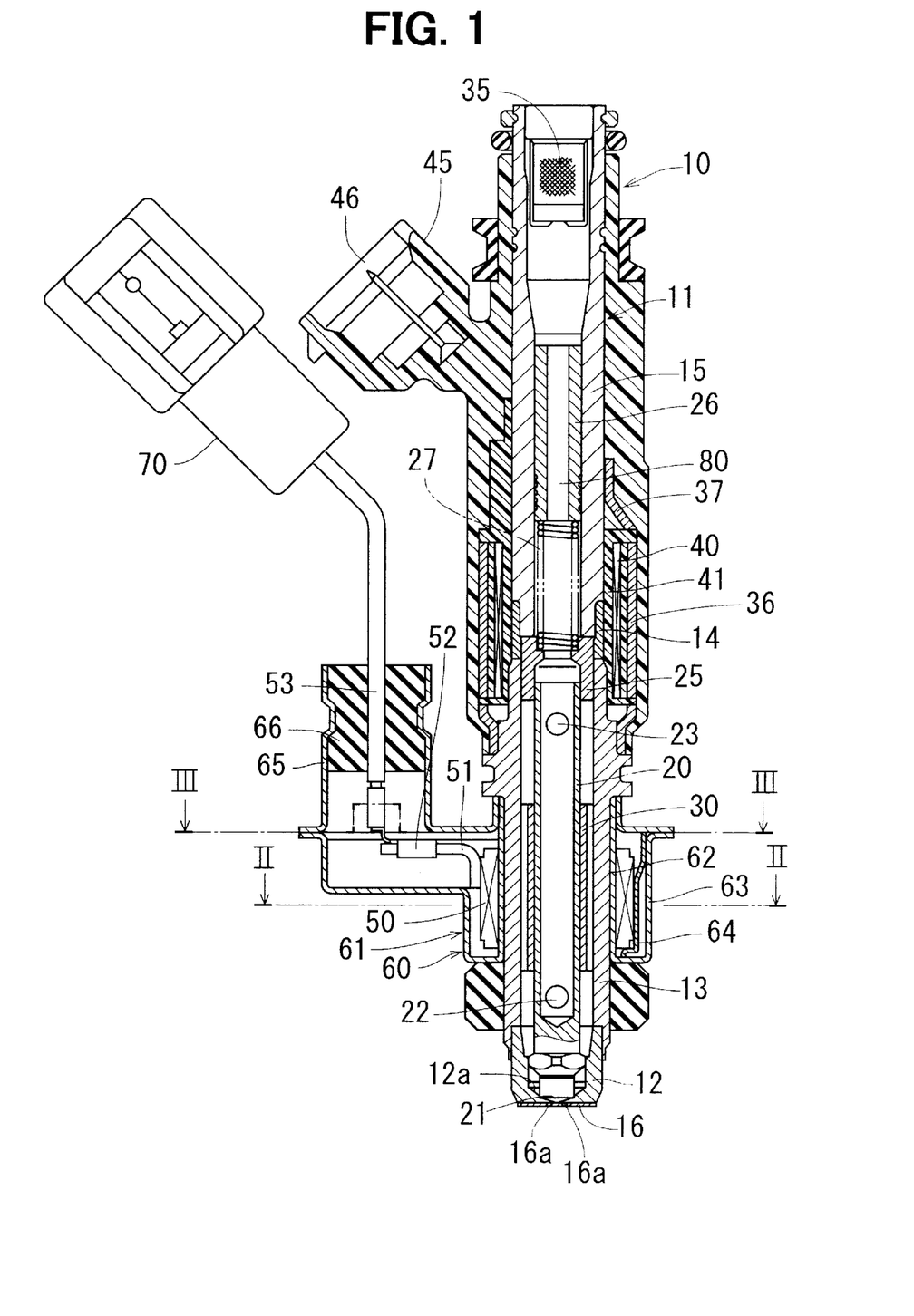
FIG. 1 is a cross-sectional view of a fuel injector according to a first embodiment of the present invention.

FIG. 1 shows a fuel injector (acting as a fuel injection device of the present invention) 10 according to a first embodiment of the present invention. A valve housing 11 of the injector 10 includes a valve body main body 12, a first tubular magnetic portion 13, a non-magnetic tubular portion 14 and a second tubular magnetic portion 15. The valve body main body 12 and the first magnetic portion 13 constitute a valve body. The valve body main body 12 includes a valve seat 12a, against which an engaging portion (base portion) 21 of a nozzle needle (acting as a valve member of the present invention) 20 can be seated. The non-magnetic portion 14 is placed between the first magnetic portion 13 and the second magnetic portion 15 and prevents a short circuit of a magnetic flux therebetween. The valve body main body 12 is welded to an inner wall of the first magnetic portion 13 on a fuel injecting side thereof. An injection hole plate 16 is welded to a bottom end outer wall of the valve body main body 12, which is located downstream of the valve seat 12a. The injection hole plate 16 has a plurality of injection holes 16a.

A fuel passage 80 is formed in the valve housing 11. The nozzle needle 20, an adjusting tube 26, a spring 27 and a filter 35 are arranged in the fuel passage 80.

The nozzle needle 20 is a hollow tube having a closed base end. The engaging portion 21 can be seated against the valve seat 12a. When the engaging portion 21 is seated against the valve seat 12a, the fuel injection through the injection holes 16a is stopped. On the other hand, when the engaging portion 21 is disengaged from the valve seat 12a, the fuel is injected through the injection holes 16a. The other end of the nozzle needle 20, which is opposite to the fuel injecting side of the nozzle needle 20, is welded to a movable core 25. A communication hole 22, which communicates between the inside of the nozzle needle 20 and the outside of the nozzle needle 20 is formed downstream of a heat transfer tube (acting as a heat transfer member of the present invention) 30 and a ceramic heater (acting as a heating means of the present invention) 50. A vapor relief hole 23 is formed upstream of the heat transfer tube 30 and the ceramic heater 50.

The second magnetic portion 15, which acts as a stationary core, is opposed to the movable core 25. The adjusting tube 26 is press fitted into the second magnetic portion 15. One end of the spring 27 is engaged with the adjusting tube 26, and the other end of the spring 27 is engaged with the movable core 25. A spring load of the spring 27 can be adjusted by adjusting an inserted length of the adjusting tube 26 press fitted into the second magnetic portion 15. The nozzle needle 20 is urged toward the valve seat 12a by an urging force of the spring 27.

Figure 2:
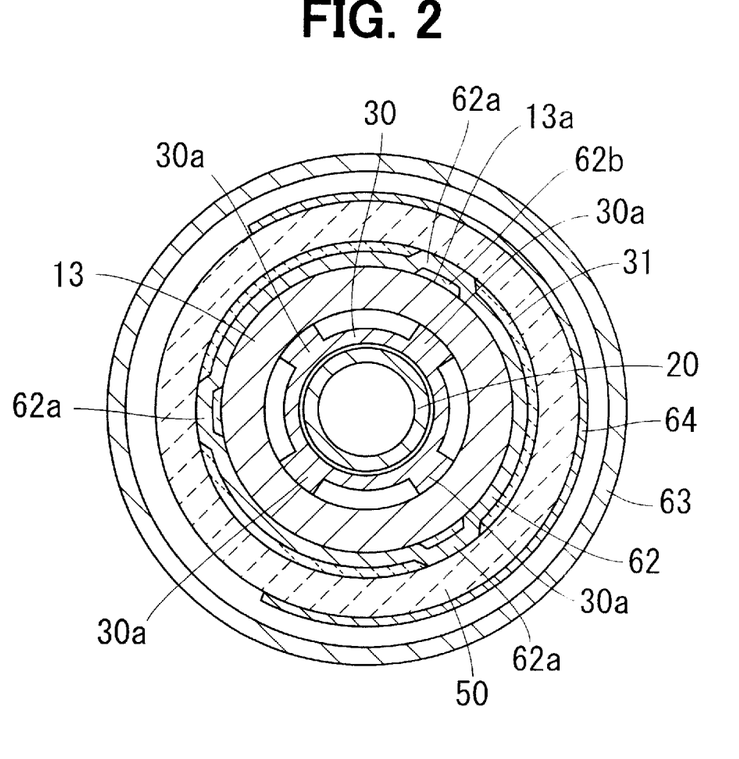
FIG. 2 is an enlarged cross-sectional view taken along line II—II in FIG. 1.

As shown in FIG. 2, the heat transfer tube 30 has a tubular form and includes projections 30a, which are arranged in a criss-cross configuration. The heat transfer tube 30 is press fitted into the first magnetic portion 13. The heat transfer tube 30 surrounds an outer peripheral surface of the nozzle needle 20. The heat transfer tube 30 defines a very small radial clearance between the heat transfer tube 30 and the nozzle needle 20 such that the very small radial clearance allows reciprocal movement of the nozzle needle 20 in the heat transfer tube 30 (or allows sliding contact of the nozzle needle 20 with the heat transfer tube 30).

With reference to FIG. 1, magnetic members 36, 37 are arranged radially outward of the coil 40 and are engaged with the first magnetic portion 13 and the second magnetic portion 15, respectively. The first magnetic portion 13, the movable core 25, the second magnetic portion 15 and the magnetic members 36, 37 constitute a magnetic circuit.

The filter 35 is arranged upstream of the valve housing 11 (i.e., the top side in FIG. 1) to remove dirt, debris and the like from the fuel.

A spool 41, around which the coil 40 is wound, is attached to an outer peripheral surface of the valve housing 11. A connector 45, which is formed by resin molding, covers outer peripheral portions of the coil 40 and of the spool 41. A terminal 46 is embedded in the connector 45 and is electrically connected to the coil 40.

Figure 3:
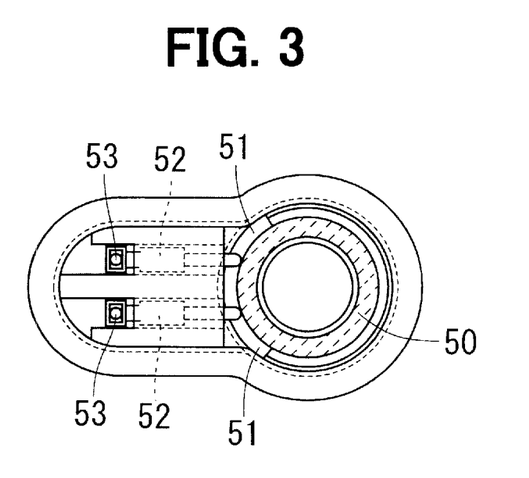
FIG. 3 is a cross-sectional view taken along line III—III in FIG. 1.

The ceramic heater 50 is formed as an integral cylindrical body by sintering a ceramic material together with a heat generating resistive element. A positive temperature coefficient (PTC) heater is considered to be one of the ceramic heaters, which can be used in the invention. The ceramic heater 50 is received in a case (acting as a case member of the present invention) 60 to protect the ceramic heater 50 from externally applied water, such as rain water. As shown in FIGS. 1 and 3, electrodes 51 made of a copper material are secured to the ceramic heater 50, for example, by a solder material. Each electrode 51 is electrically connected to a corresponding electric line 53 through a terminal 52. The electrode 51 and the terminal 52 are connected to each other, for example, by swaging or spot welding. Each electric line 53 is electrically connected to a corresponding terminal (not shown) of the connector 70.

The case 60 has a case main body 61 and a cover 65. The case main body 61 and the cover 65 are both made of a metal material and are secured to each other in a manner that restrains penetration of water into the case 60, for example, by spot welding, laser welding, press fitting or crimping. A rubber material 66 seals between the cover 65 and the electric lines 53. As shown in FIGS. 1 and 2, the case main body 61 is an integral body and includes an inner tube (acting as a heat conductive resilient member of the present invention) 62 and an outer tube 63. The ceramic heater 50 is placed between the inner tube 62 and the outer tube 63. A highly heat-conductive material 31, such as a graphite material, is filled between the inner tube 62 and the ceramic heater 50. A heater holder 64 urges the ceramic heater 50 against the inner tube 62. The inner tube 62 includes radial projections 62a circumferentially arranged at regular intervals, as shown in FIG. 2. A space 62b is formed radially inward of each projection 62a, i.e., between an inner wall of each projection 62a and an outer wall 13a of the first magnetic portion 13, 50 that a resilient force is generated in the inner tube 62. Because of the resilient force, the inner tube 62 resiliently engages with the inner wall of the ceramic heater 50 and also with the outer wall 13a of the first magnetic portion 13. The ceramic heater 50 has a relatively low mechanical strength with respect to a tensile force. Thus, the resilient force of the inner tube 62, which is applied to the inner peripheral surface of the ceramic heater 50, should be selected such that the resilient force of the inner tube 62 allows the inner tube 62 to engage with both the first magnetic portion 13 and the ceramic heater 50 and is limited below the mechanical strength of the ceramic heater 50.

The fuel, which has passed through the filter 35 and has reached the fuel passage 80 of the valve housing 11, flows as follows. That is, the fuel flows through a fuel passage in the adjusting tube 26, a fuel passage in a portion of the second magnetic portion 15 located downstream of the adjusting tube 26, a fuel passage in the nozzle needle 20, the communication hole 22, a fuel passage defined between an outer wall of the nozzle needle 20 and inner walls of the first magnetic portion 13 and of the valve body main body 12, and an opening formed between the engaging portion 21 and the valve seat 12a upon disengagement of the nozzle needle 20 from the valve seat 12a. Then, this fuel is injected through the injection holes 16a formed in the injection hole plate 16.

In the injector 10 constructed in the above manner, when the electric power supply to the coil 40 is switched off, the nozzle needle 20 is urged by the spring 27 in a downward direction in FIG. 1, i.e., in a valve closing direction, so that the engaging portion 21 of the nozzle needle 20 is seated against the valve seat 12a to stop the fuel injection through the injection holes 16a.

When the electric power supply to the coil 40 is switched on, the magnetic flux generated in the coil 40 flows through the magnetic circuit, which surrounds the coil 40, so that magnetic attractive forces are generated between the second magnetic portion 15 and the movable core 25. Then, the movable core 25 and the nozzle needle 20 are attracted toward the second magnetic portion 15 against the urging force of the spring 27, so that the engaging portion 21 is disengaged from the valve seat 12a. Thus, the fuel, which is conducted from the inside of the nozzle needle 20 to the outside of the nozzle needle 20 through the communication hole 22, is injected through the injection holes 16a. Since the communication hole 22 is formed downstream of the heat transfer tube 30, the fuel, which is conducted to the outside of the nozzle needle 20 through the communication hole 22, flows toward the injection holes 16a without interference from the heat transfer tube 30.

For example, when the electric power is supplied to the ceramic heater 50 for a predetermined time period at engine start-up, a temperature of the ceramic heater 50 rises instantaneously. Since the inner tube 62 is resiliently engaged with the first magnetic portion 13 and also with the ceramic heater 50, the heat of the ceramic heater 50 is effectively conducted from the inner tube 62 to the first magnetic portion 13. Furthermore, since the heat transfer tube 30 is press fitted to the inner wall of the first magnetic portion 13, the heat is effectively conducted from the first magnetic portion 13 to the heat transfer tube 30. Since the heat transfer tube 30 defines a very small radial clearance, which allows for reciprocal movement of the nozzle needle 20, between the heat transfer tube 30 and the nozzle needle 20, the nozzle needle 20 is heated by the heat conducted to the heat transfer tube 30, and thus the fuel located inside the nozzle needle 20 is heated.

When the electric power supply to the coil 40 is switched on, and thus the nozzle needle 20 is disengaged from the valve seat 12a, the fuel located inside the nozzle needle 20, which has been heated by the heat of the ceramic heater 50, flows from the inside of the nozzle needle 20 to the outside of the nozzle needle 20 through the communication hole 22 and is injected through the injection holes 16a. When the heated fuel is injected through the injection holes 16a, the fuel is boiled under reduced pressure and is thus atomized. Even during cold start-up of the engine, noxious components in the exhaust gases of the engine can be reduced through atomization of the fuel carried out by supplying the electric current to the ceramic heater 50 for a predetermined time period.

Fuel vapor can be generated in the fuel in the fuel passage 80 at the outside of the nozzle needle 20 when the fuel is heated by the ceramic heater 50. When the fuel vapor is accumulated in the fuel located outside of the nozzle needle 20, the flow of the fuel is restrained. In the present embodiment, since the vapor relief hole 23 is formed upstream of the ceramic heater 50, a majority of the fuel vapor generated in the fuel located outside the nozzle needle 20 is conducted upstream of the fuel passage 80 through the vapor relief hole 23 and also through the inside of the nozzle needle 20.

Figure 4:
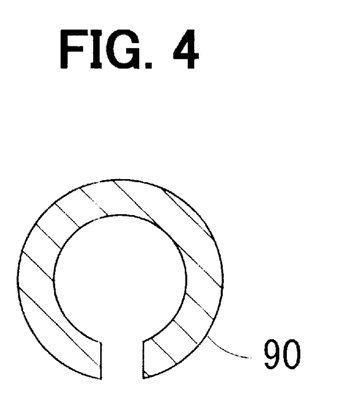
FIG. 4 is a cross-sectional view, showing a modification of a heat transfer tube of the injector.

In place of the heat transfer tube 30, which has projections 30a arranged in the criss-cross configuration shown in FIG. 2, a heat transfer tube 90 having a C-shaped cross-section shown in FIG. 4 can be used. Furthermore, a cylindrical member formed from a wavy or corrugated plate can be used as the heat transfer tube.

In the above embodiment, the inner tube 62 of the case 60 is also used as the heat conductive resilient member, which is resiliently engaged with the inner wall of the ceramic heater 50 and also with the outer wall 13a of the first magnetic portion 13. However, the resilient member and the case member can be separately provided. Furthermore, it is possible to provide only one of the following arrangements: (a) the inner tube 62 resiliently engaged with the inner wall of the ceramic heater 50 and also with the outer wall 13a of the first magnetic portion 13, and (b) the heat transfer tube 30 press fitted to the inner wall of the first magnetic portion 13 in such a manner that the heat transfer tube 30 surrounds the outer peripheral surface of the nozzle needle 20.

Furthermore, in the above embodiment, the inner tube 62 can be inserted in the ceramic heater 50 with a clearance fit.

In the above embodiment, the hollow nozzle needle is used. However, a solid nozzle needle can be used in place of the hollow nozzle needle. In the case of the solid nozzle needle, the heat transfer tube 30 or its equivalent is not required. Furthermore, any heating means can be used in place of the ceramic heater 50 if it can quickly heat the fuel.

SECOND EMBODIMENT

Figure 5:
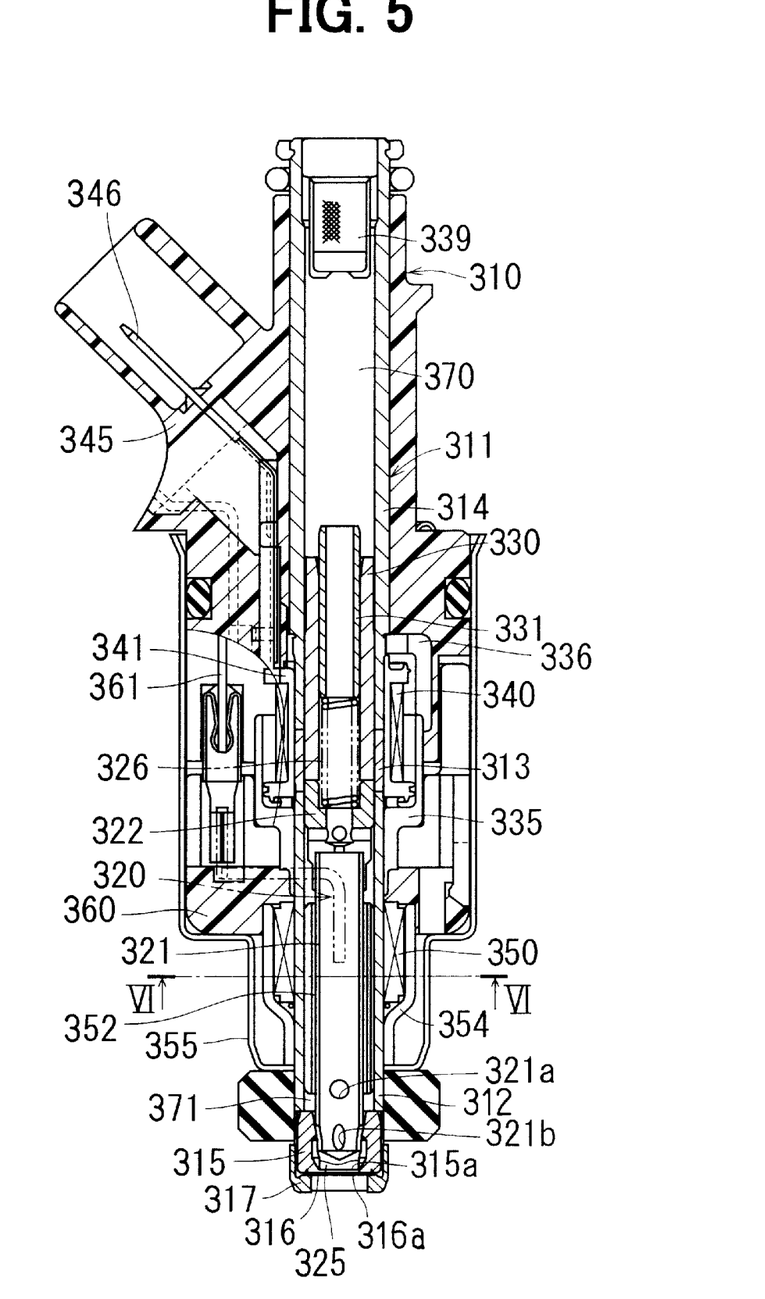
FIG. 5 is a cross-sectional view of a fuel injector according to a second embodiment of the present invention.

FIG. 5 shows a fuel injector 310 according to a second embodiment of the present invention. A valve housing 311 is shaped into a tubular form and has magnetic and non-magnetic portions. The valve housing 311 is made, for example, of a compounded magnetic material. The valve housing 311 has a fuel passage 370. A valve body main body 315, a nozzle needle (acting as a valve member of the present invention) 320, a spring (acting as an urging means of the present invention) 326, a stationary core 330, an adjusting tube 331, and a filter 339 are arranged in the fuel passage 370.

The valve housing 311 is an integral body and has a first magnetic portion 312, a non-magnetic portion 313 and a second magnetic portion 314, which are arranged in this order in a downstream-to-upstream direction of fuel flow (i.e., in a bottom-to-top direction in FIG. 1). The first magnetic portion 312 and the second magnetic portion 314 of the valve housing 311 are magnetized. The non-magnetic portion 313 of the valve housing 311 is demagnetized, for example, by heating the corresponding portion of the valve housing 311. The non-magnetic portion 313 prevents a short circuit of a magnetic flux between the first magnetic portion 312 and the second magnetic portion 314. The valve body main body 315 and an injection hole plate 316 are received inside the first magnetic portion 312 on the fuel injecting side (downside in FIG. 5) of the first magnetic portion 312. The valve housing 311 and the valve body main body 315 constitute a valve body of the present invention.

The injection hole plate 316 is shaped into a cup shape and is secured to an end surface of the valve body main body 315 on the fuel injecting side thereof by a holder 317 in such a manner that the injection hole plate 316 abuts against the end surface of the valve body main body 315. The injection hole plate 316 is the thin plate-like component and has a plurality of fuel injection holes 316a penetrating there-through at its center portion.

As shown in FIG. 5, the nozzle needle 320 includes a cylindrical portion 321 and an engaging portion 325. The cylindrical portion 321 is made of a magnetic material. The engaging portion 325 is made of a non-magnetic material and is laser welded to an inner wall of the cylindrical portion 321 on the injection hole plate 316 side of the cylindrical portion 321. A movable core 322 of the cylindrical portion 321, which is located on the stationary core 330 side of the cylindrical portion 321, has a thick wall and is axially opposed to the stationary core 330. The engaging portion 325 can be seated against a valve seat 315a formed in the valve body main body 315.

The stationary core 330 is received in the non-magnetic portion 313 and the second magnetic portion 314 and is axially opposed to the movable core 322 of the nozzle needle 320. The adjusting tube 331 is press fitted into the stationary core 330. The spring 326 has one end engaged with the adjusting tube 331 and the other end engaged with a spring seat provided in the movable core 322. A spring load of the spring 326 can be adjusted by adjusting an inserted length of the adjusting tube 331 press fitted into the stationary core 330. The nozzle needle 320 is urged toward the valve seat 315a by an urging force of the spring 326.

Magnetic members 335, 336 are arranged radially outward of a coil 340 and are engaged with the first magnetic portion 312 and the second magnetic portion 314, respectively. The stationary core 330, the movable core 322 of the nozzle needle 320, the first magnetic portion 312, the second magnetic portion 314 and the magnetic members 335, 336 constitute a magnetic circuit.

The filter 339 is arranged upstream of the valve housing 311 (i.e., the top side in FIG. 5) to remove dirt, debris and the like from the fuel.

A spool 341, around which the coil 340 is wound, is attached to an outer peripheral surface of the valve housing 311. A connector 345, which is formed by resin molding, covers outer peripheral portions of the coil 340 and of the spool 341. A terminal 346 is embedded in the connector 345 and is electrically connected to the coil 340.

Figure 6:
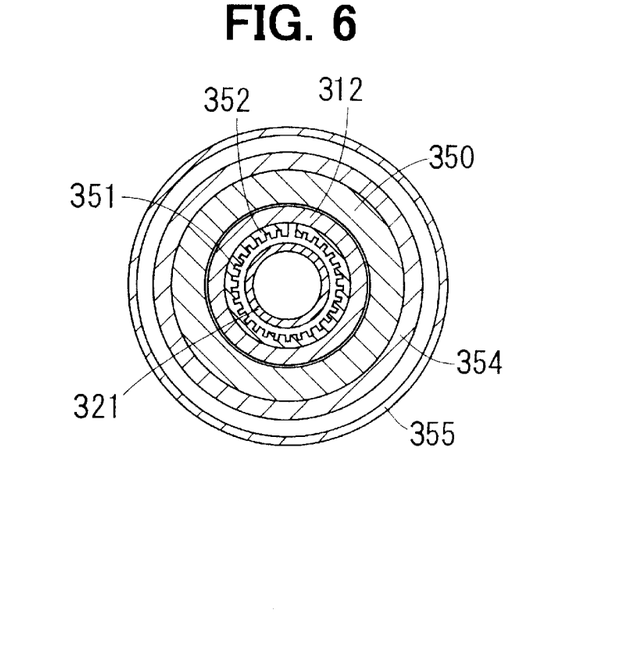
FIG. 6 is a cross-sectional view taken along line VI—VI in FIG. 5.

A ceramic heater (acting as a heating means of the present invention) 350 is arranged as shown in FIGS. 5 and 6. A heater holder 354 is provided radially inward of a holder (or case) 355, and the ceramic heater 350 is received inside the heater holder 354. The ceramic heater 350 is provided radially outward of the first magnetic portion 312. A heat transfer tube (acting as a heat transfer member of the present invention) 352 is arranged radially inward of the first magnetic portion 312. The cylindrical portion 321 of the nozzle needle 320 is arranged radially inward of the heat transfer tube 352 in an axially reciprocable manner. A space 351, which acts as a fuel passage, is provided between the cylindrical portion 321 of the nozzle needle 320 and the heat transfer tube 352. The heat transfer tube 352 is heated by the heater 350 via the first magnetic portion 312. An inner peripheral wall of the ceramic heater 350 is in direct contact with an outer peripheral wall of the first magnetic portion 312.

A connector 360 is resin molded around the ceramic heater 350. Terminals 361 are embedded in the connector 360 and are electrically connected to a heat generating resistive element of the ceramic heater 350.

The fuel, which has passed through the filter 339 and has reached the fuel passage 370 of the valve housing 311, flows as follows. That is, the fuel flows through a fuel passage in the adjusting tube 331, a fuel passage in a portion of the stationary core 330 located downstream of the adjusting tube 331, a fuel passage in the nozzle needle 320, a communication hole 321a, a fuel passage 371 formed between the cylindrical portion 321 and the first magnetic portion 312, a communication hole 321b, and an opening formed between the engaging portion 325 and the valve seat 315a upon disengagement of the nozzle needle 320 from the valve seat 315a. Then, this fuel is injected through the injection holes 316a. A portion of the nozzle needle 320 located between the communication hole 321b and the engaging portion 325 has a relatively larger outer diameter or increased outer diameter. This relatively larger outer diameter portion (or the increased diameter portion) of the nozzle needle 320 narrows the fuel passage between the outer wall of the nozzle needle 320 and the inner wall of the valve body main body 315 without substantially reducing the fuel injection amount injected through the injection holes 316a. This allows effective and instantaneous heating of the fuel.

In the injector 310 constructed in the above manner, when the electric power supply to the coil 340 is switched off, the nozzle needle 320 is urged by the spring 326 in a downward direction in FIG. 5, i.e., in a valve closing direction, so that the engaging portion 325 of the nozzle needle 320 is seated against the valve seat 315a to close the injection holes 316a.

When the electric power supply to the coil 340 is switched on, the magnetic flux generated in the coil 340 flows through the magnetic circuit, which surrounds the coil 340. Thus, magnetic attractive forces are generated between the stationary core 330 and the movable core 322 of the nozzle needle 320. As a result, the nozzle needle 320 is attracted to the stationary core 330, and thus the engaging portion 325 is disengaged from the valve seat 315a. Therefore, the fuel is conducted through the communication hole 321a and the fuel passage 371 and is injected through the injection holes 316a.

When the engine is started by switching on of an ignition key, electric power is supplied to the ceramic heater 350 for a predetermined time period right after the switching on of the ignition key. When electric power is supplied to the ceramic heater 350, a temperature of the ceramic heater 350 rises instantaneously. At this stage where electric power is continuously supplied to the ceramic heater 350, when the nozzle needle 320 is disengaged from the valve seat 315a by supplying electric power to the coil 340, the fuel located within the space 351 and the fuel located inside the cylindrical portion 321 are heated inside the heat transfer tube 352 by the ceramic heater 350. When the heated fuel is injected through the injection holes 316a, the fuel is boiled under reduced pressure and is thus atomized. Even during cold start-up of the engine, noxious components in the exhaust gases of the engine can be reduced through the atomization of the fuel carried out by supplying electric current to the ceramic heater 350 for a predetermined time period.

Fuel vapor can be generated in the fuel in the fuel passage 371 because of the heating by the ceramic heater 350. When the fuel vapor is accumulated in the fuel in the fuel passage 371, the fuel vapor acts like a damper and prevents the reciprocal movement of the nozzle needle 320. In the second embodiment, since the communication hole 321a is formed downstream of the ceramic heater 350, a majority of the fuel vapor generated in the fuel passage 371 is conducted to the upstream of the fuel passage 370 through the communication hole 321a and also through the inside of the nozzle needle 320. Thus, a response of the nozzle needle 320 is improved.

Figures 7, 8:
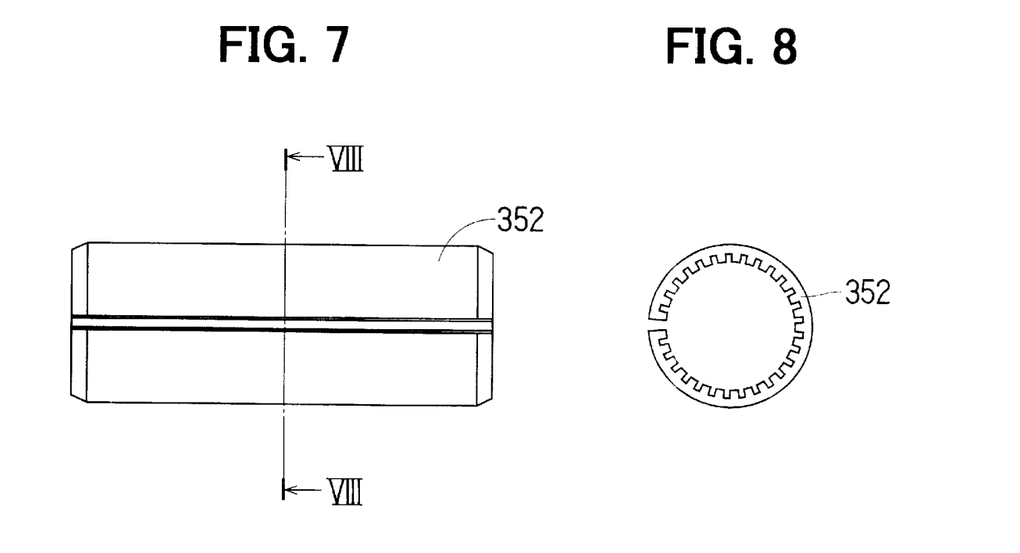
FIG. 7 is a side view of a heat transfer tube of the second embodiment.
FIG. 8 is a cross-sectional view taken along line VIII—VIII in FIG. 7.

With reference to FIGS. 6 to 8, the heat transfer tube 352 of the second embodiment has a C-shaped cross-section. This C-shaped cross-section allows a reduction in a rigidity of the heat transfer tube 352 and thus allows a reduction of a load applied to the first magnetic portion 312 from the heat transfer tube 352 when the heat transfer tube 352 is press fitted into the first magnetic portion 312. The heat transfer tube 352 also has a corrugated inner wall surface, which includes alternating ridges and grooves, to increase the contact surface area between the heat transfer tube 352 and the fuel. The ridges and grooves of the corrugated inner wall surface of the heat transfer tube 352 extend generally in the axial direction and are arranged alternately in a circumferential direction. Thus, the fuel can be heated effectively.

Figure 9:
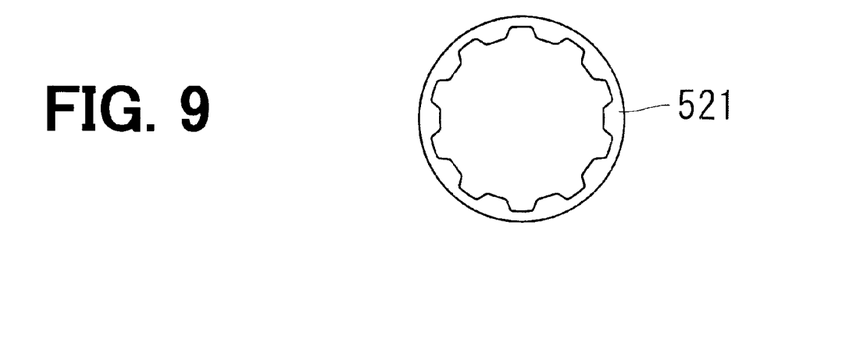
FIG. 9 is a cross-sectional view similar to FIG. 8, showing a modification of the heat transfer tube of the second embodiment.
Figure 10:
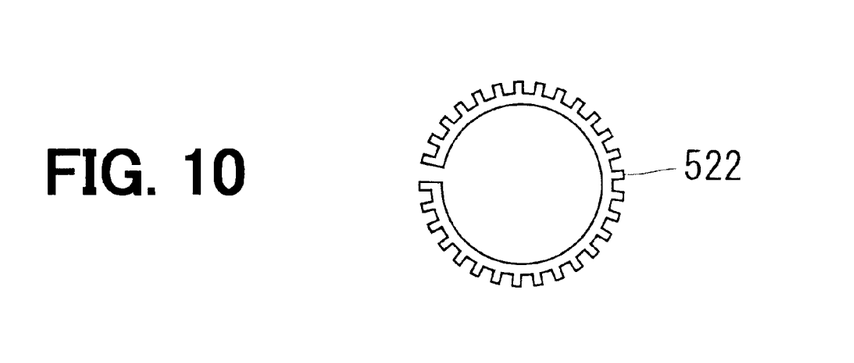
FIG. 10 is a cross-sectional view similar to FIG. 8, showing another modification of the heat transfer tube of the second embodiment.
Figure 11:
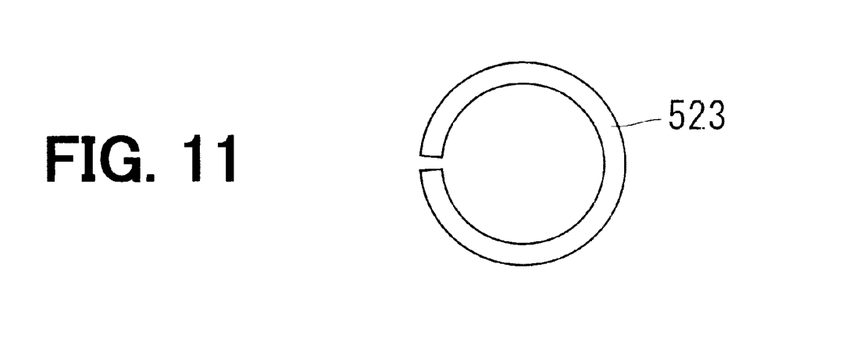
FIG. 11 is a cross-sectional view similar to FIG. 8, showing a further modification of the heat transfer tube of the second embodiment.

Modifications of the heat transfer tube of the injector of the second embodiment are shown in FIGS. 9, 10, and 11.

A heat transfer tube 521 shown in FIG. 9 has a smaller number of ridges and grooves in a corrugated inner wall surface of the heat transfer tube 521 in comparison to the heat transfer tube 352 of FIG. 8. A heat transfer tube 522 shown in FIG. 10 has ridges and grooves on an outer wall surface of the heat transfer tube 522. A heat transfer tube 523 shown in FIG. 11 has a smooth inner wall surface and a smooth outer wall surface. The heat transfer tube 523 reduces an effective axial fluid passage surface area in comparison to the case where the heat transfer tube is not present, so that the heat transfer tube 523 provides a choking effect to increase the flow rate of the fuel. As a result, a heat transfer coefficient for transferring heat from the heat transfer tube 523 to the fuel flowing along the heat transfer tube 523 is advantageously increased.

THIRD EMBODIMENT

Figure 12:
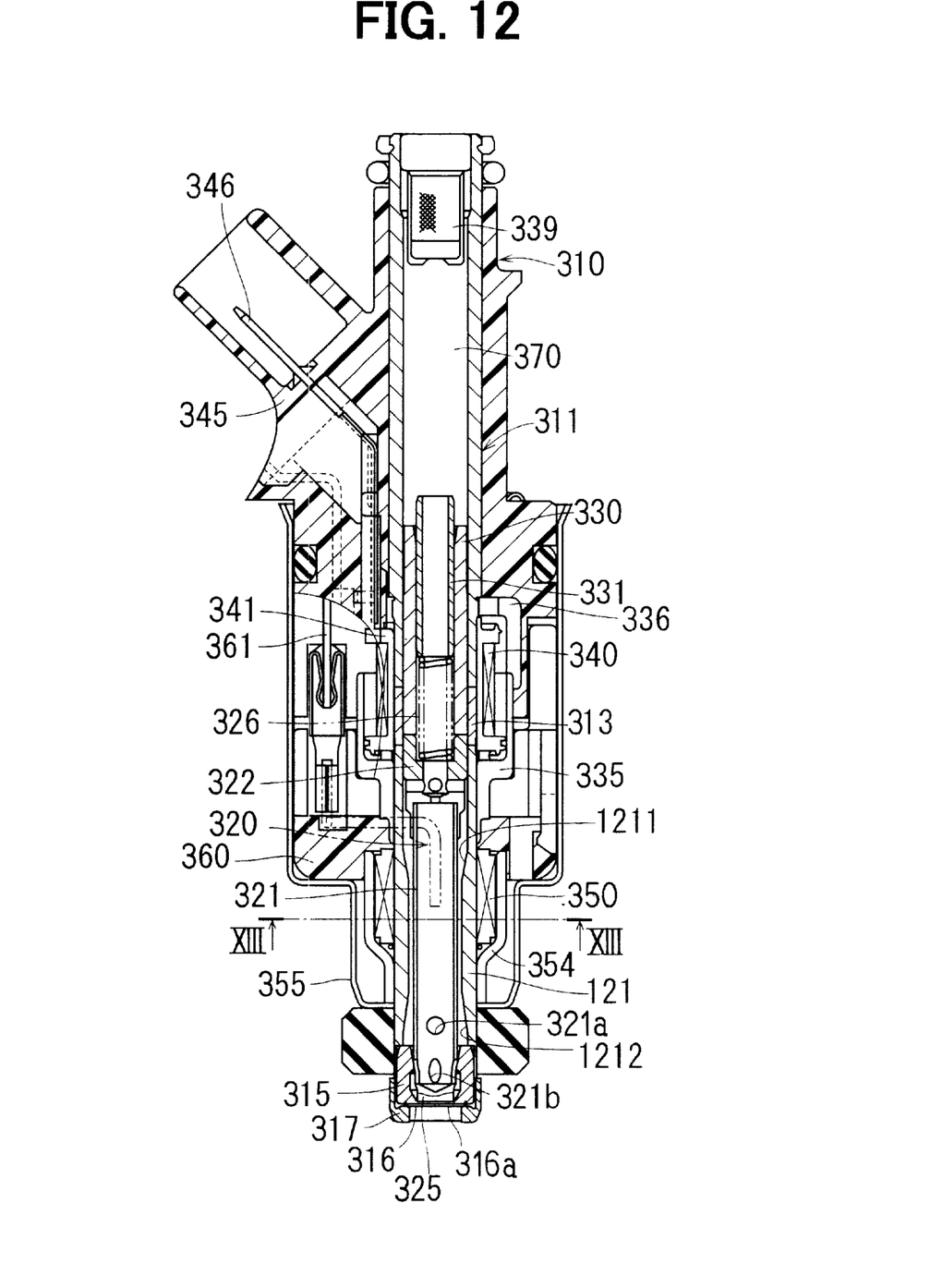
FIG. 12 is a cross-sectional view of a fuel injector according to a third embodiment of the present invention.
Figure 13:
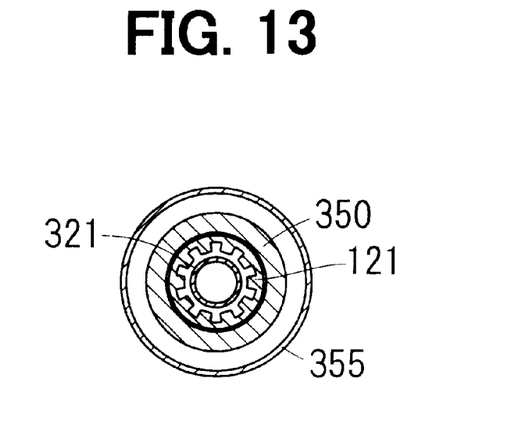
FIG. 13 is a cross-sectional view taken along line XIII—XIII in FIG. 12.

FIGS. 12 and 13 show a fuel injector 310 according to a third embodiment of the present invention. In the third embodiment, a first magnetic portion 121 is provided in place of the first magnetic portion 312 of the second embodiment. The first magnetic portion 121 forms a relatively thick portion on a cylindrical inner wall of the first magnetic portion 121. In other words, the first magnetic portion and the heat transfer tube of the previous embodiments are integrated into the first magnetic portion 121, and the thick portion is formed in the inner wall of the first magnetic portion 121. In a cross-section of the thick portion, the thick portion has a corrugated inner wall surface, as shown in FIG. 13. Axial ends 1211, 1212 of the thick portion of the first magnetic portion 121 are tapered or slanted and are connected to relatively thin portions of the first magnetic portion 121, respectively. With this arrangement, the flow passage is narrowed, and thus a contact efficiency between the fuel and the thick portion is increased. As a result, the fuel can be more easily heated.

FOURTH EMBODIMENT

Figure 14:
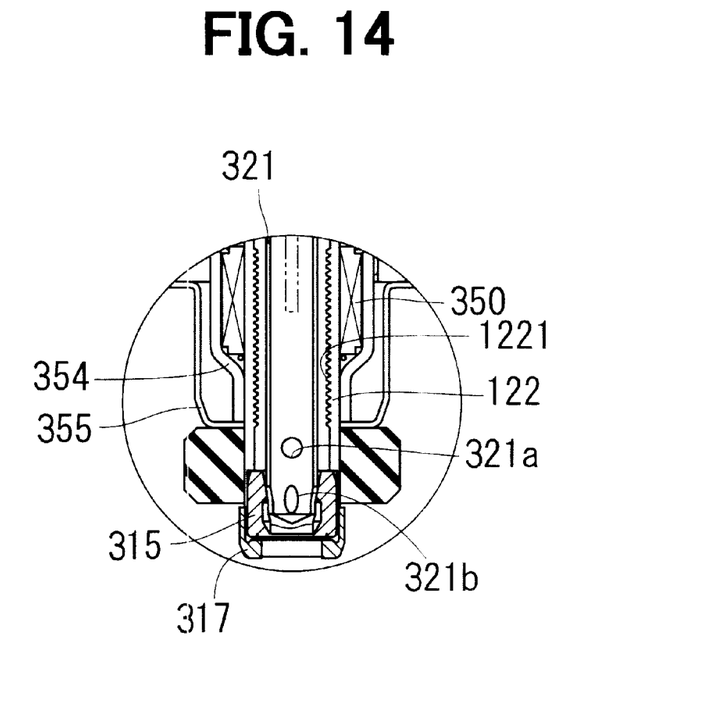
FIG. 14 is a partial cross-sectional view of a fuel injector according to a fourth embodiment of the present invention.

A fuel injector according to a fourth embodiment of the present invention will be described with reference to FIG. 14. In the fourth embodiment, in place of the first magnetic portion 121 of the third embodiment of FIG. 12, there is provided a first magnetic portion 122, which has a corrugated inner surface 1221. The corrugated inner surface 1221 includes alternating ridges and grooves. The ridges and grooves of the corrugated surface 1221 extend generally in a circumferential direction of the first magnetic portion 122 and are arranged alternately in an axial direction of the first magnetic portion 122. The fuel, which passes along the corrugated inner surface 1221 of the first magnetic portion 122, is advantageously heated at a high efficiency due to a large contact surface area between the fuel and the corrugated inner surface 1221 of the first magnetic portion 122, which is heated by the ceramic heater 350.

Additional advantages and modifications will readily occur to those skilled in the art. The invention in its broader terms is therefore, not limited to the specific details, representative apparatus, and illustrative examples shown and described.

What is claimed is:

1. A fuel injection device comprising:
   a valve body including:
      a fuel passage;
      a fuel injection hole located at a downstream end of the fuel passage; and
      a valve seat positioned upstream of the fuel injection hole in the fuel passage;
   a valve member, which is reciprocably received in the fuel passage and has an engaging portion that is configured to be seated against the valve seat, wherein the engaging portion closes the injection hole when the engaging portion is seated against the valve seat, and the engaging portion opens the injection hole when the engaging portion is disengaged from the valve seat;
   a heating means for directly heating at least a portion of an outer peripheral wall surface of the valve body located upstream of the valve seat, wherein the heating means is located radially outward of the outer peripheral wall surface of the valve body; and a heat transfer member located between an inner peripheral wall surface of the valve body and the valve member, wherein the heat transfer member is stationary relative to the valve body, and an axial extent of the heat transfer member overlaps at least partially with an axial extent of the heating means.

2. A fuel injection device according to claim 1, wherein:

the valve member has a hollow tubular form having a closed base end, which faces the valve seat; and the valve member has a communication hole, which penetrates through a peripheral wall of the valve member and is located downstream of a plane, which extends through an axial center of the heating means in a direction perpendicular to an axial direction of the valve member.

3. A fuel injection device according to claim 2, wherein the valve member has an increased diameter portion between the communication hole and the engaging portion.

4. A fuel injection device according to claim 1, wherein the heating means is a ceramic heater.

5. A fuel injection device according to claim 1, wherein the heat transfer member has a tubular form.

6. A fuel injection device according to claim 5, wherein the heat transfer member has a C-shaped cross section.

7. A fuel injection device according to claim 5, wherein the heat transfer member and the valve member defines a fuel passage therebetween.

8. A fuel injection device according to claim 5, wherein the valve member makes sliding contact with the heat transfer member.

9. A fuel injection device according to claim 5, wherein the heat transfer member has a plurality of alternating ridges and grooves on at least one of an inner peripheral wall surface and an outer peripheral wall surface of the heat transfer member.

10. A fuel injection device according to claim 9, wherein the ridges and grooves of the heat transfer member extend generally in an axial direction of the heat transfer member and are arranged alternately in a circumferential direction of the heat transfer member.

11. A fuel injection device according to claim 1, wherein the heat transfer member is integrated into the inner peripheral wall surface of the valve body.

12. A fuel injection device according to claim 1, wherein the heat transfer member includes a plurality of alternating ridges and grooves formed in the inner peripheral wall surface of the valve body.

13. A fuel injection device according to claim 12, wherein the ridges and grooves of the heat transfer member extend generally in an axial direction of the valve body and are arranged alternately in a circumferential direction of the valve body.

14. A fuel injection device according to claim 12, wherein the ridges and grooves of the heat transfer member extend generally in a circumferential direction of the valve body and are arranged alternately in an axial direction of the valve body.

15. A fuel injection device according to claim 2, further comprising a heat conductive resilient member, which is arranged between the valve body and the heating means and is resiliently engaged with both the valve body and the heating means, wherein the heat conductive resilient member conducts heat of the heating means to the valve body.

16. A fuel injection device according to claim 15, wherein the heat conductive resilient member has a tubular form and includes a plurality of radial projections circumferentially arranged at regular intervals.

17. A fuel injection device according to claim 16, wherein each radial projection of the heat conductive resilient member and the outer peripheral wall surface of the valve body define a space therebetween.

18. A fuel injection device according to claim 17, further comprising a highly heat conductive material filled radially between an inner peripheral surface of the heating means and an outer peripheral surface of the heat conductive resilient member and circumferentially between adjacent two of the radial projections of the heat conductive resilient member.

19. A fuel injection device comprising:

a valve body including:

a fuel passage;

a fuel injection hole located at a downstream end of the fuel passage; and a valve seat positioned upstream of the fuel injection hole in the fuel passage;

a valve member, which is reciprocably received in the fuel passage, wherein the valve member closes the injection hole when the valve member is seated against the valve seat, and the valve member opens the injection hole when the valve member is disengaged from the valve seat;

a heating means for directly heating at least a portion of an outer peripheral wall surface of the valve body located upstream of the valve seat, wherein the heating means is located radially outward of the outer peripheral wall surface of the valve body;

a heat conductive resilient member, which is arranged between the valve body and the heating means and is resiliently engaged with both the valve body and the heating means, wherein the heat conductive resilient member conducts heat of the heating means to the valve body; and a heat transfer member located between an inner peripheral wall surface of the valve body and the valve member, wherein the heat transfer member is stationary relative to the valve body, and an axial extent of the heat transfer member overlaps at least partially with an axial extent of the heating means.

20. A fuel injection device according to claim 19, further comprising a case member, which covers the heating means and protects the heating means from externally applied water, wherein a portion of the case member located between the valve body and the heating means also acts as the heat conductive resilient member.

21. A fuel injection device according to claim 1, wherein the heat transfer member has a smooth cylindrical outer peripheral surface.

* * * * *